United States Patent
Kaatrasalo et al.

(10) Patent No.: US 9,403,474 B2
(45) Date of Patent: Aug. 2, 2016

(54) SYSTEM FOR CONTROLLING WORK LIGHTS IN A FORESTRY MACHINE

(71) Applicant: Ponsse Oyj, Vierema (FI)

(72) Inventors: Tero Kaatrasalo, Ilsalmi (FI); Eero Hotti, Sonkajarvi (FI)

(73) Assignee: Ponsse Oyj, Vierema (FI)

( * ) Notice: Subject to any disclaimer, the term of this patent is extended or adjusted under 35 U.S.C. 154(b) by 0 days.

(21) Appl. No.: 14/894,957

(22) PCT Filed: May 16, 2014

(86) PCT No.: PCT/FI2014/050375
§ 371 (c)(1),
(2) Date: Nov. 30, 2015

(87) PCT Pub. No.: WO2014/195568
PCT Pub. Date: Dec. 11, 2014

(65) Prior Publication Data
US 2016/0121784 A1    May 5, 2016

(30) Foreign Application Priority Data
Jun. 3, 2013    (FI) .................................... 20135611

(51) Int. Cl.
*A01G 23/097* (2006.01)
*B60Q 1/24* (2006.01)
(Continued)

(52) U.S. Cl.
CPC .............. *B60Q 1/245* (2013.01); *A01G 23/083* (2013.01); *H05B 33/0845* (2013.01)

(58) Field of Classification Search
CPC ...... B23B 31/006; B23Q 1/76; A01G 23/097; A01G 23/08; A01G 23/091; B27M 3/00; B27M 1/08; B60Q 1/24; B60Q 1/0483; H05B 33/0815; H05B 37/0272; H05B 37/029
USPC .......... 144/382–385, 420, 421, 335, 336, 2.1, 144/3.1, 34.1; 315/291, 307, 294, 312, 149
See application file for complete search history.

(56) References Cited

U.S. PATENT DOCUMENTS

| | | | | |
|---|---|---|---|---|
| 7,591,292 B2* | 9/2009 | Happonen | .......... | A01G 23/0955 144/208.2 |
| 7,644,580 B2* | 1/2010 | Alfthan | ................ | A01G 23/095 60/425 |

(Continued)

FOREIGN PATENT DOCUMENTS

CA    2586371 A1    8/2008

OTHER PUBLICATIONS

International Search Report dated Sep. 4, 2014 received for International Application PCT/FI2014/050375 (4 pages).

(Continued)

*Primary Examiner* — Haissa Philogene
(74) *Attorney, Agent, or Firm* — Beem Patent Law Firm (57) ABSTRACT

The invention relates to a system for controlling work lights in a forestry machine, which system includes a harvester head (16), attached to the set of booms (14) of the forestry machine (10), for felling and processing trees, at least one work light (20) attached to the harvester head (16) for illuminating the harvester head (16) and its surroundings, and control means (15) for controlling the operation of the work light (20). The control means (15) are the valve control unit (25) belonging to the harvester head (16) for controlling the valves of the harvester head (16), which control unit (25) is arranged to feed power and/or control the power feed to the said work light (20).

11 Claims, 5 Drawing Sheets

(51) Int. Cl.
*H05B 33/08* (2006.01)
*A01G 23/083* (2006.01)

(56) References Cited

U.S. PATENT DOCUMENTS 7,802,595 B2 * 9/2010 Einola ............... B60K 6/12
 144/356
8,644,964 B2 * 2/2014 Hendron ............ E02F 9/265
 700/20

2006/0278305 A1 12/2006 Barlow
2011/0023999 A1 2/2011 Milne et al.
2012/0188089 A1 7/2012 Thomsen

OTHER PUBLICATIONS

"LED Lighting on the Harvester Head," Arbetsrapport 736-2012, online report,Skogforski, Sweden. Published Dec. 31, 2012.
"CCF Harvesting Method Development: Harvester Head Visibility," Forest Research, No. 1200A/56/07, dated Aug. 2008.

* cited by examiner

SYSTEM FOR CONTROLLING WORK LIGHTS IN A FORESTRY MACHINE

FIELD OF THE INVENTION

This application claims benefit of priority from International Patent Application No: PCT/FI2014/050375filed May 16, 2014, which claims benefit of Finland Patent Application No. 20135611, both of which are incorporated by reference in their entirety.

The invention relates to a system for controlling work lights in a forestry machine, which system includes a harvester head, attached to the set of booms of the forestry machine, for felling and processing trees, at least one work light attached to the harvester head for illuminating the harvester head and its surroundings, and control means for controlling the operation of the work light.

Felling and collecting trees are work tasks that are carried out at all times of the day and year, irrespective of the weather and lighting conditions. The task of forestry machine drivers is to control the forestry machine and particularly the harvester head, carried at the end of the set of booms of the forestry machine, in connection with the felling and processing of trees. From the point of view of carrying out the work, it is important that the operator has always the best possible visibility of the operation of the harvester head and of the immediate surroundings. Due to the nature of the work task, work often takes place in the dark, when work lights are required to improve visibility.

BACKGROUND OF THE INVENTION

Various kinds of lighting systems for illuminating the harvester head are known from the prior art. In the known systems, the power supply to the work lights attached to the harvester head is arranged by bringing the input conductors from the base machine of the forestry machine along the set of booms and control has typically taken place from the cab of the forestry machine, either by active control by the driver or in practice by leaving the lights continuously switched on or off. However, the work lights often consume a great deal of power and can be controlled only as a totality. In some cases, the work lights can even make it more difficult for the operator to see the work clearly. In other words, it would be advantageous to implement the control of the work lights installed on the harvester head automatically, so that the driver need not think separately about controlling the work lights, never mind giving inputs to the control system for switching on the work lights or adjusting the properties of the illumination.

SUMMARY OF THE INVENTION

The invention is intended to create a better system than the solutions of the prior art for controlling the work lights of a forestry machine, by means of which the work lights can be controlled more accurately and savings made in power consumption, as well as simultaneously improving work ergonomics and visibility.

This invention can be achieved by means of a system for controlling work lights in a forestry machine, which system includes a harvester head attached to the set of booms of the forestry machine for felling and processing trees, at least one work light attached to the harvester head for illuminating the harvester head and its surroundings, and control means for controlling the operation of the work light. The control means are a valve control unit belonging to the harvester head for controlling the valves of the harvester head, which control unit is arranged to feed power and/or to control the power input to the work lights. In this way, the control of the work lights can integrated as part of the control of the harvester head, so that separate control of the work lights will be unnecessary. Separate electric leads need not be brought to the harvester head from the forestry machine to control the work lights. In addition, in this way the control of the work lights is connected to a so-called embedded control system, which is, as such, known and is becoming common in modern work machines. Smarter functionality and automatic operations are easy to add to the work lights control with the aid of various applications programmed into the control system. Particularly by means of the said control system, much control and state data is available nearly without exception, such as the state of the operations of the harvester head, the attitude of the harvester head, dimension data measured from the tree, etc. On the basis of these data, it is possible to implement various control algorithms for the work lights.

The work light is preferably a LED work light. A LED work light is a particularly advantageous type of light for use in the system according to the invention, on account of, among other things, its low power consumption relative to its light output, its compact size, and its good reliability. In particular, the low power consumption of a LED work light permits both control and power supply through the control unit of the harvester head. The power capacities of valves according to present standards are particularly suited to the control of LED lights. In the solution according to the invention, the term work light can comprise lighting solutions integrated in the structure of the harvester head in many different ways, in addition to ready commercial surface-installation work lights. The amount and quality of the light released or produced by the said work light can be preferably arranged to be adjusted through the, for example embedded control system used, so that the best and most appropriate result can be achieved in each work situation and environmental conditions. The said output of the control unit can be, at its simplest, of the on-off type, when the work light can be switched on or off. Often in control units according to the prior art there are outputs, the current or voltage of which can be adjusted. This adjustment can be preferably made, for example, as a so-called PWM (Pulse Width Modulation) output. If the work light is connected to such an output in the solution according to the invention, the strength of the light produced by it can also be adjusted through the said embedded control system.

The control unit preferably includes several operating devices, such as valve-control outputs, from at least one of which outputs the control unit is arranged to feed power to the said work light. Thus, the power supply is controlled also from the control unit, so that the lights are lit only according to the control of the control unit.

According to one embodiment, the control unit includes an input for external control, or, for example, for the sensoring for some measurement. Thus, the work lights can be controlled on the basis of an external measurement variable.

In the system according to the invention, the valve control unit can also be used only to control the power supply, if the power supply to the work light takes place using a separate cable. In that case, the valve control unit can control the power supply with the aid of a relay.

The system can include a sensor for producing a control variable for the control unit. With the aid of the sensor, the conditions affecting work can be monitored and the operation of the work light can be controlled on its basis.

The control unit is preferably an electrical control unit, which includes a processing unit and software installed in it and used in it as an embedded system. In terms of the present invention, it is indeed surprising that an electrical control unit of an embedded control system can also be used for the control and power supply of work lights. Particular benefits can further be achieved especially in the case of a harvester head carried at the end of a long set of booms of a harvester, to which it would be difficult to arrange electrical power supply and control in other ways.

The control unit can include software means, which are arranged to control the said work light on the basis of at least one preset criterion. Thus, with the aid of the control unit, the work light can be controlled on the basis of, for example, lighting conditions, the time of day, or similar, thus reducing the number of things to be adjusted manually by the operator. The work of a harvester driver is already considerably wearing and challenging, due to its rapid cycles and long shifts, so that automatic operation of control of the light system must be kept as an aim when developing the lighting system.

The sensor can be a PECU switch for controlling the work light according to the amount of light. The work lights will then switch on automatically on the basis of the information given by the PECU switch as light decreases.

The work light's control means in the system preferably include controllers located in the cab of the forestry machine. With the aid of the controllers, the operator can also control the operation of the work light manually.

According to a second embodiment, the control unit includes software means, which are arranged to control the work light according to the work stages of the harvester head. Thus, the work light can be switched on at precisely the point in the work stage at which visible observations by the operator are important and be switched off in turn, for example, during feeding a tree, thus saving electricity and preventing the driver from being unnecessarily dazzled when there is no benefit from the work light.

According to a third embodiment, the control unit includes software means, which are arranged to control the work light according to the time of year and/or day. The operator need not then separately switch on the work light, instead it switches on automatically according to the control of the software means. The said time of year and/or day information, in the same way as the machine's GPS positioning information are, in an as such known manner, ready and easily available for the use of the embedded control system, so that the functionality described above is easy to implement.

The system can include several work lights, some of which are arranged to be controlled with the aid of the software means belonging to the control unit, according to the work stages of the harvester head or forestry machine. Thus, for example, the illumination of the cutting device of the harvester head can be switched on immediately before cutting a tree and at the same time the other lights of the forestry machine switched off, so that the felling and cross-cutting of the tree can be seen more clearly by the operator.

In the system according to the invention, the work light's control can be preferably arranged using the existing valve control unit of the harvester head. With the aid of the control unit, power is fed to the work light or power supply to the work light is controlled as required, thus avoiding unnecessary use of the work light. This in turn lengthens the life of the work light and saves energy consumption. In the system according to the invention, the term work light's control refers to switching the power supply on or off, adjusting the power supply, altering the direction of the work light or the wavelength of the light produced by the work light, or other similar adjustments. The work light of the system according to the invention can be any work light whatever of the harvester head, but preferably the work light is the work light of the cutting device. It is surprising that the valve control unit can be used to control the work light, as generally both the work light and the valves are controlled by means of separate units.

According to one embodiment, the said work light can also be arranged to communicate the work stage or state of the harvester head, the harvester, or the tree-felling process. At its simplest, this can take place by switching the light on or off, or alternatively by adjusting, for example, the amount or hue, i.e. the wavelength of the light, based on one or more measured or identified control conditions.

In the following, the invention is described in detail with reference to the accompanying drawings depicting some embodiments of the invention, in which.

Figure 1:
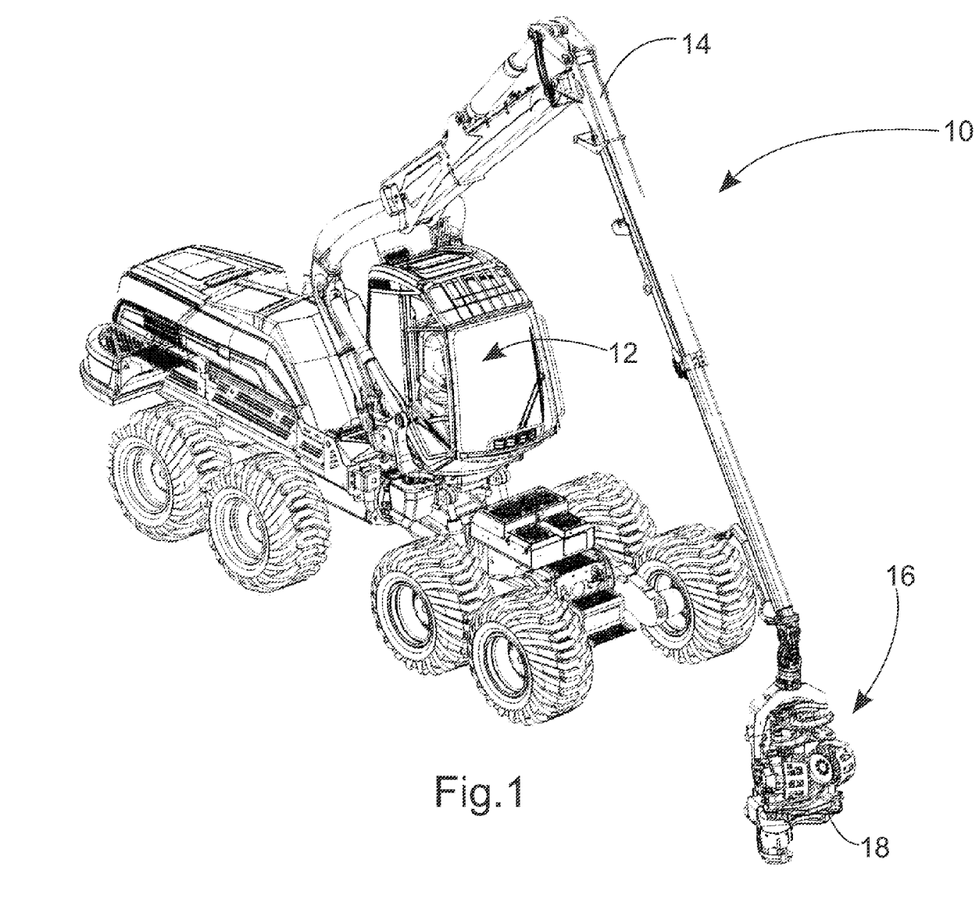
FIG. 1 shows the system according to the invention in a forestry machine.

FIG. 1 shows the system according to the invention applied to a forestry machine 10. The forestry machine 10 can be a forestry tractor, which is equipped with a cab 12 and a work boom 14. A harvester head 16, by means of which trees are cut and processed, is suspended from the end of the work boom. The harvester head 16 receives its drive power and control from the forestry machine 10 along the work boom. Between the harvester head 16 and the forestry machine 10 is a data-transfer bus, for example a CAN bus, Arcnet, Ethernet, or other corresponding permanently cabled or wireless connection.

Figure 2:
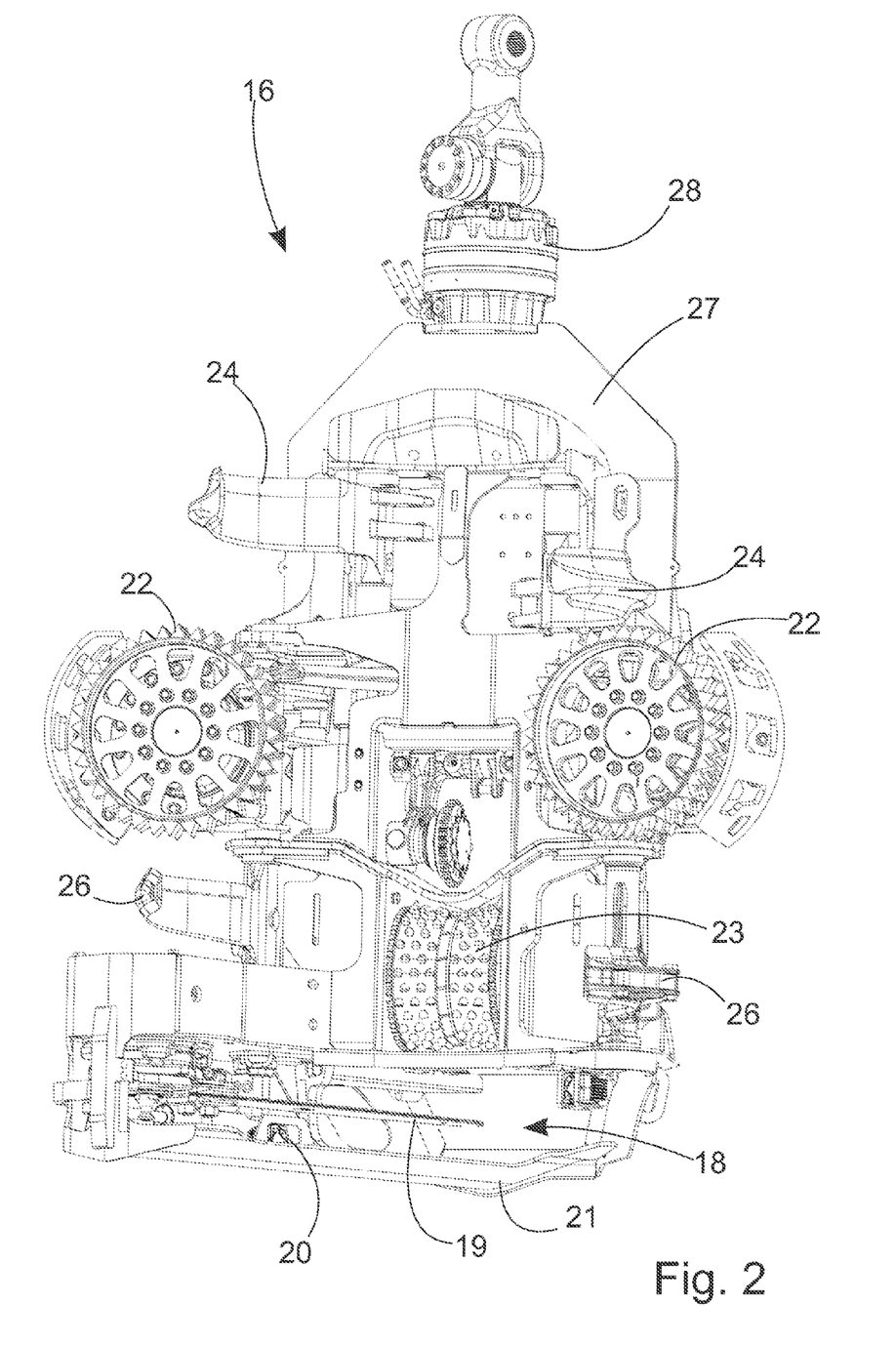
FIG. 2 shows an axonometric view of the harvester head of the system according to the invention seen with the gripping and tree-processing elements of the harvester head open.

According to FIG. 2, the harvester head 16 includes a body 27, a rotator 28, by means of which the harvester head 16 is suspended rotatably from the boom 14 of FIG. 1, stripping blades 24 and 26, feed rollers 22 and 23, and a cutting device 18. According to the figure, the cutting device 18 is preferably a cutting saw, which is located in a saw case 21. The cutting saw can include, according to the prior art, a saw flange 19, arranged to rotate relative to the saw case, around which a blade chain runs. In the system of FIG. 2, the work light is precisely a work light 20, illuminating the cutting-saw saw flange 19 and the cutting event, and located on the side of the saw case 21 pointing towards the saw flange 19.

Figure 3:
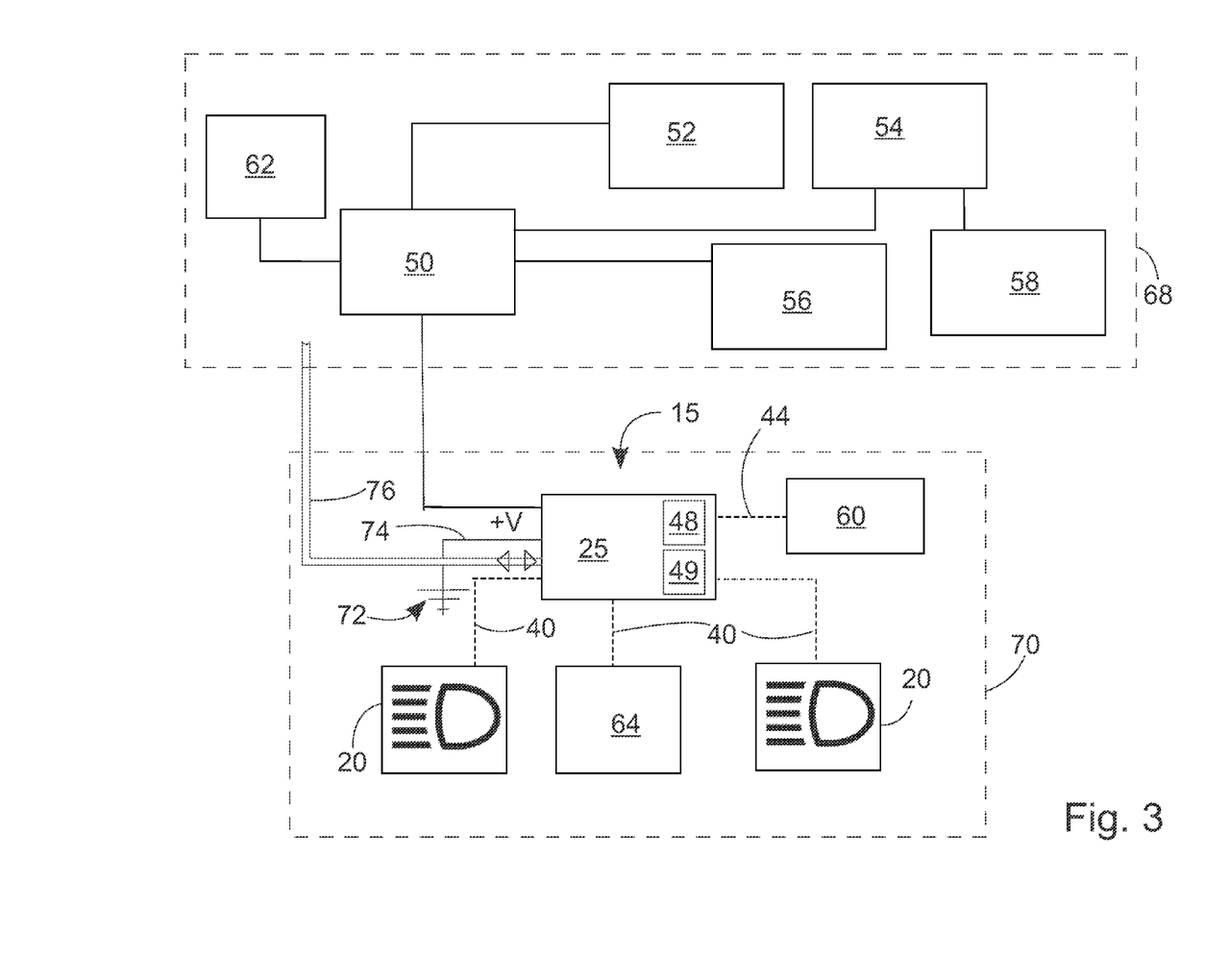
FIG. 3 shows a schematic block diagram of the system according to the invention.

FIG. 3 shows a block diagram of the system according to the invention on a schematic level. According to FIG. 3, the components of the system can be divided into components located in the forestry machine 68 and components located in the harvester head 70. From the forestry machine, control information and voltage/current are sent to the harvester head preferably through a single multi-terminal input cable 76. At the forestry machine end, the system can include in the embodiment according to the figure, the forestry machine's central computer 50 and a display unit 62 connected to it. The central computer 50 and the display unit 62 can be, in an as such known manner, also integrated to form a single totality. The forestry machine's chassis steering unit 52, the work boom control unit 56, and the operator's interface control unit 54 can preferably be connected to the central computer 50 using, for example, a CAN bus. Other necessary additional units can also be connected as required. All the control means 58, by which the operator controls the forestry machine and all its functions, can, in turn, be connected to the control unit 54 of the interface. The control means can be separate inputs for control entries, for example, switches, buttons, or joystick controllers. In the case of the forestry machine, the system according to the invention can correspond to existing forestry machines according to the prior art.

The work light control means 15 are also connected to the forestry machine's central computer 50. According to the invention, the control means 15 are the harvester head valve control unit 25 in the harvester head. The power supply 74 to the harvester head is connected to the electrical valve control unit 25. If necessary, a ground line 72 also branches out from this same feed cable 76. All the other units in the harvester head are combined in the control unit 25. These units can be, for example, sensors 60, i.e. measurement sensors examining the length and diameter of the tree, the solenoids of the control valves, and at least one work light 20 according to the invention. According to FIG. 3, there can be several work lights 20 and they are all connected to the valve control unit 25, preferably in a corresponding manner to the solenoid 64 of the control valves, or the other corresponding controls going from the control unit 25 to the valves.

The valve control unit 25 can comprise, for example, ten outputs 40, which feed current and/or voltage adjustable over a specific range of variation. The current and/or voltage range is preferably the same in all the outputs, i.e. the same in the control outputs, but it can also vary. The control outputs can thus typically be at least of the on/off type, only able to be switched fully on or off, and steplessly adjustable. From the point of view of the invention, however, it is preferable for the control unit to be an ordinary control unit for systems embedded in the harvester head and known from the prior art, which without alterations can be used for the control and power supply of the work lights. The valve control unit 25 includes a processing unit 49, by means of which the software means 48 are operated, which direct the power supply to the control outputs. The control unit can include a separate input 44, i.e. a control input, from which preselected criteria for the control of the work light can be fed to the software means of the control unit.

The work light used in the system according to the invention is preferably a LED work light. Work lights based on LED technology are low-power, typically about 5-15 W, but illuminate very effectively with good efficiency compared, for example, to conventional halogen lamps. Thanks to the low power, the control voltage of the control outputs of the control unit, originally designed for control of the valves, will be sufficient for the control and power supply of the work lights. The current fed to the LED work lights can be, for example, in the order of 100-1000 mA, so that the voltage used will be in the order of 5-150 V, depending on the current and power of the work light. In principle, the type of lamp used can be something other than LED lamp technology, for example, xenon or halogen, or in the future a cold-cathode lamp, or some other lamp type made possible by the development of lamp technology, as long as it can be controlled through the harvester-head control unit.

When handling trees with a forestry machine, the operator usually examines the quality of the trees being felled and processed. Depending on conditions, the identification of quality faults can even be very difficult, especially in the dark. Timber buyers are unwilling to pay, for example, for rotten trees, and a log or other piece of a tree that is even slightly rotten at the butt end can be completely rejected due to the rot. It is therefore important for the operator to see the cutting surface of the tree clearly. Generally, forestry machines includes other work lights than the work light located on the harvester head. Conventionally, work lights are indeed installed permanently, for example, on the cab roof of the forestry machine, and also often on the set of booms, so that the work lights follow the work event better. According to one embodiment, work lights that are elsewhere than on the harvester head can be dimmed or switched off while the harvester-head work lights are being used. Typically this can be used to prevent bright work lights being reflected from the booms or harvester head. This helps the operator to see the cutting surface of the tree and to identify rot in it. By means of the system according to the invention, it is easy to control the lights of the forestry machine, and particularly the harvester head, on the basis of a preset criterion, i.e. a so-called control criterion, with the aid of the harvester-head control unit, as all the harvester-head control commands travel through the control unit.

Various control criteria can be, for example, the ambient light prevailing in a cutting situation, the time of day, the time of year, or the operating stage of the harvester head. More specifically, the term ambient light refers to how dark or light it is. The term operating stage of the harvester head means, for example, that some of the forestry machine's lights are switched off at the end of the harvester heads's tree-feeding stage. When performing tree felling sawing, only the work light illuminating the cutting device and its vicinity is switched on, which helps the operator to see, for example, stones near the butt of the tree, or rot or another possible fault inside the tree in the cutting surface immediately when the tree falls. According to one embodiment, the tree can also be reversed slightly after cutting, so that the light beam of the work light will strike the tree cutting surface better. The system can include means for entering control criteria to the control unit, which means can be, for example, the control means of the forestry machine.

The term work-light control can, in this connection, refer to switching off or starting current/voltage feed, adjusting the amount of current/voltage feed, adjusting the orientation of the work light or the wavelength of the work light, or similar operations. The system can include means for altering the orientation of the work light on the basis of a control criterion. Thus, for example, by monitoring the orientation of the harvester head, the harvester head's work light can be orientated so that in no situation is it pointing directly towards the operator and thus dazzling the operator. In the dark, dazzling the operator will weaken the operator's vision for a long time until their vision returns to normal. In the same way, the work light can also be switched off, if the path of motion of the harvester head appears to be such that the work light will point towards the operator. According to one embodiment, the work light can also be arranged to be moveable on, for example, guides, so that the orientation of the light beam can be altered.

According to one embodiment, the wavelength of the work light can be altered for the duration of the operation of the cutting device, so that a specific wavelength can show rot in the cutting surface of a tree considerably better than normal white light. For example, light with a wavelength of 330-400 nm has been shown to facilitate distinguishing rot by eye from the cutting surface of a tree. The system can also include a sensor or camera, which detects the light reflected back from the cutting surface of the tree and, on its basis, decides automatically whether or not there is rot in the cutting point in question. When using machine vision, it is particularly important for the cutting point to be illuminated sufficiently. According to another embodiment there can be several work lights for different wavelengths, one of which produces white light and another, for example, light with a suitable wavelength for revealing rot. According to one embodiment, the wavelength of a work light fitted to the harvester head, to illuminate, for example, the cutting surface, can change from the wavelength of conventional white light to a wavelength facilitating the distinguishing of rot, immediately when the cutting of the tree has been completed. The moment when this changes takes place can be precisely defined through the control system in, as such, known ways, with the aid of so-called saw control. In other words, while cutting sawing is taking place and the cutting surface is not yet visible to the driver, it can be advantageous to use a normal white hue and automatically change to hue more suited to the analysis of the cutting surface that becomes visible.

Figure 4:
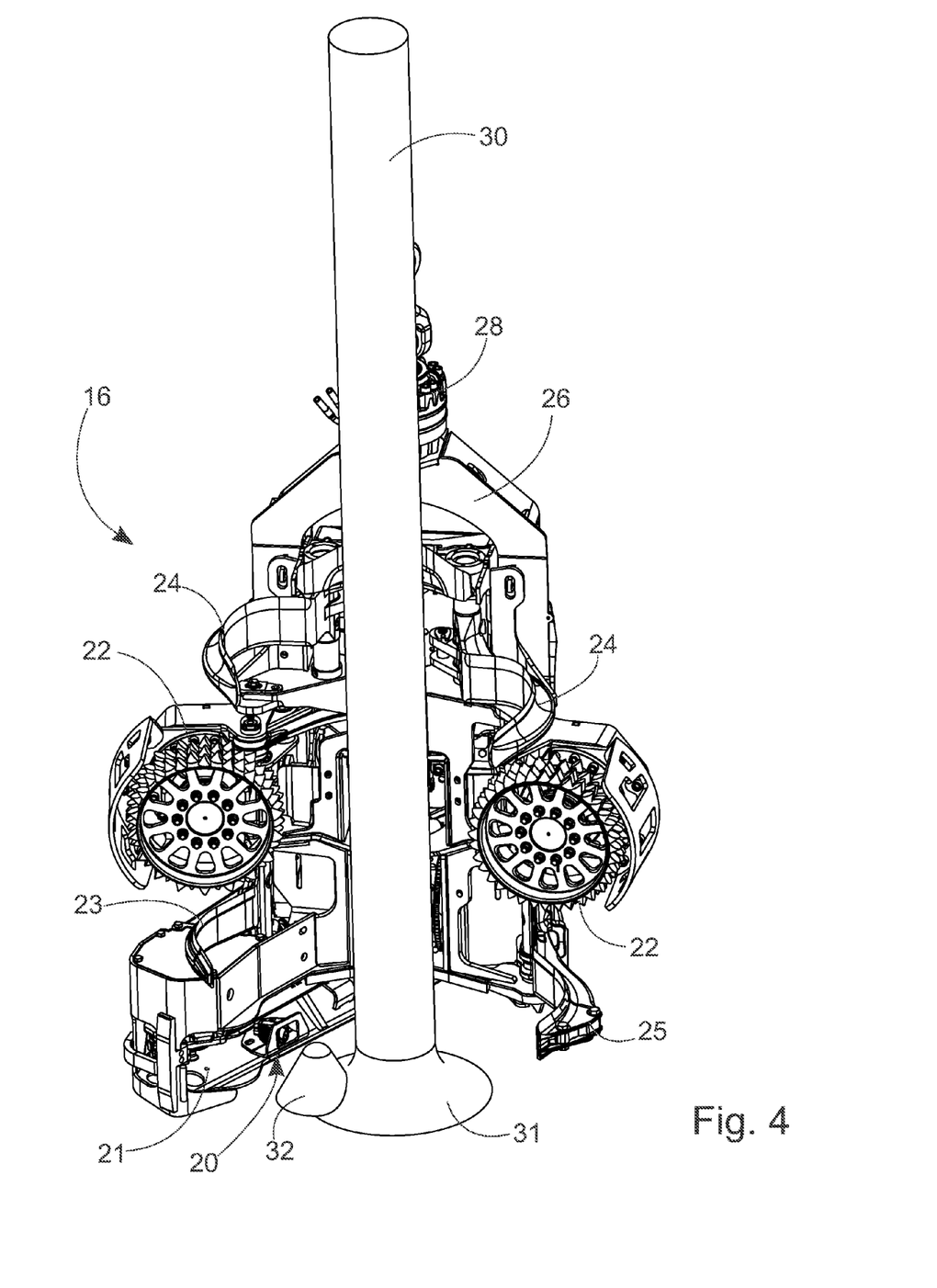
FIG. 4 shows an axonometric view of the harvester head of the system according to the invention, seen when cutting a tree.

FIG. 4 shows the harvester head 16 comprising the system according to the invention when it is cutting a tree 30. The work light 20 is preferably located on the cutting device 18 i.e. in this case the cutting saw, on the saw case 21 and is oriented to illuminate the cutting saw in the direction of the cutting movement performed by the saw flange. In the cutting situation shown in FIG. 4, there is a stone 32 in the vicinity of the butt 31 of the tree 30, which is directly in the path of the saw flange of the cutting saw. If the operator tries to cut the tree 30, the chain rotating around the saw flange of the cutting saw will strike the stone 32 and be liable to be damaged. If it strikes the stone, the teeth in the chain will be blunted, the chain may break, and the saw flange may be damaged. It is thus important for the operator to be able to see the operation of the cutting device as well as possible the whole time, to be able to avoid striking the stone. According to FIG. 4, the work light 20 points in the direction of the saw flange of the cutting saw, illuminating the saw flange and possible obstacles in front of it. Thus, the operator sees clearly whether the path of the saw flange of the cutting saw is clear, or whether the harvester head must, for example, be lifted or moved slightly to avoid the obstacle.

Figure 5:
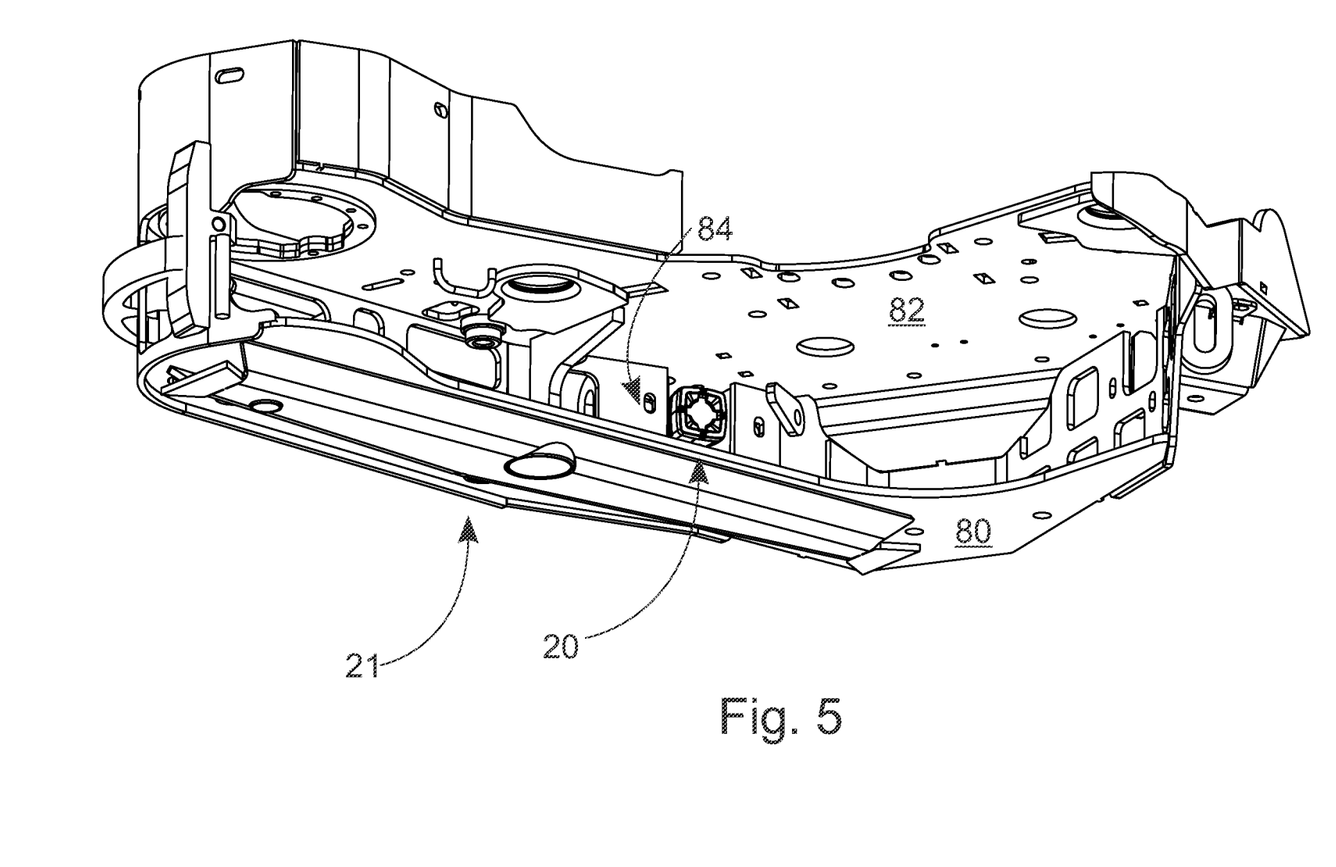
FIG. 5 shows an axonometric view of the case of the cutting device of the system according to the invention, shown without the cutting device.

FIG. 5 shows a second alternative location for the work light 20 inside the saw case 21 of the cutting device. The work light is preferably located about half way along the saw case considering the total length of the saw flange, when its illuminating power will be sufficient to light the whole saw flange. To be able to see the work light 20 more clearly, the saw flange is not shown in FIG. 5. The saw case 21 consists of cover plates 80 and 82, which are preferably parallel to the saw flange and between which the saw flange is pivoted to rotate relative to the planes of the plates essentially at right angles to the shaft. In addition to the cover plates 80 and 82, the saw case includes a bottom 84, which can be lightened with various openings, which also act as exit openings for snow, rubbish, and sawdust. The work light is preferably located in the saw case as far back as possible relative to the direction of feed of the tree being cut, so that the illumination of the cutting device is as effective as possible.

Differing from FIG. 5, the work light can also be located according to FIGS. 2 and 4 near the outer edge of the sides 80 and 82, which are sides on the opposite edge to the bottom 84. The work light 20 will then be so low from the height between the sides, so that the saw flange will be able to travel in the middle of the space between the cover plates. In other words, the height of the light in the direction between the sides should be preferably at most one-third of the distance between the plates. The connectors of the work light remain under the cover of the harvester head. As a totality, the work light or work lights are located in such a way that they are well protected from impacts, but also easy to change, if necessary. Differing from the figures, there can also be several work lights.

In this connection, it should be understood that the location of the work light shown in the figures can also be used to control work lights is systems according to the prior art in forestry machines.

The system according to the invention can be used in connection with harvester heads according to the prior art and the system can also be retrofitted in existing harvester heads, in which there is, however a suitable control unit in terms of the system.

The invention claimed is:

1. A system for controlling work lights in a forestry machine, the system comprising:
   a harvester head attached to a set of booms of the forestry machine, the harvester head including a cutting device for felling and processing trees;
   at least one work light for illuminating the harvester head and its surroundings, the at least one work light attached to the harvester head and oriented to illuminate the cutting device; and
   a valve control unit for controlling the operation of the work light and valves of the harvester head, the valve control unit attached to the harvester head, where the valve control unit can either feed power to the work light, control power feed to the work light, or both.

2. The system of claim 1, where the work light is a LED light.

3. The system of claim 1, where the valve control unit comprises a plurality of valve-control outputs, where the control unit is arranged to feed power to the work light through at least one of the plurality of valve-control outputs.

4. The system of claim 1, where the valve control unit comprises an input for external control.

5. The system of claim 1, further comprising a sensor for producing a control variable for the valve control unit.

6. The system of claim 1, where the valve control unit comprises a processor and a a software module including instructions stored on a non-transitory computer readable medium for controlling the work light on the basis of at least one preset criterion.

7. The system of claim 5, where the sensor is a PECU switch for controlling the work light according to a level of illumination.

8. The system of claim 1, where in the valve control unit is coupled to controllers located in a cab of the forestry machine.

9. The system of claim 1, where the valve control unit comprises a processor and a software module including instructions stored on a non-transitory computer readable medium for controlling the work light according to work stages of the harvester head.

10. The system of claim 1, where the valve control unit comprises a processor and a software module including instructions stored on a non-transitory computer readable medium for controlling the work light according to time of at least one of year and day.

11. The system of claim 1, further comprising a plurality of work lights, where the valve control unit comprises a processor and a software module including instructions stored on a non-transitory computer readable medium for controlling at least some of the plurality of work lights according to the work stages of either the harvester head, the forestry machine, or both.

* * * * *